Figure 1:
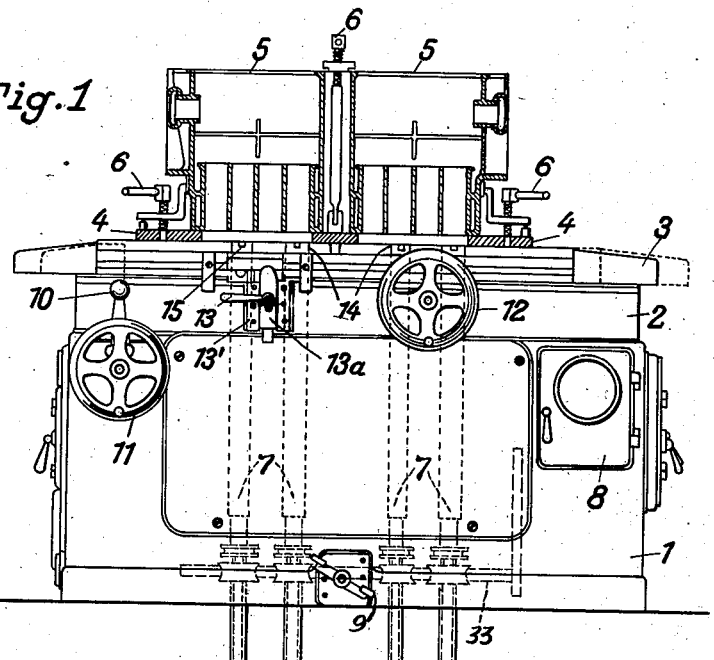

July 6, 1937.  C. PLEGER  2,086,284

PRECISION BORING MACHINE

Filed Oct. 31, 1935   2 Sheets-Sheet 1

Inventor:
C. Pleger

By: Glascock Downing Seebold
Attys.

July 6, 1937.  C. PLEGER  2,086,284
PRECISION BORING MACHINE
Filed Oct. 31, 1935  2 Sheets-Sheet 2

Inventor,
C. Pleger
By: Glascock Downing & Seebold
Attys.

Patented July 6, 1937

2,086,284

UNITED STATES PATENT OFFICE 2,086,284

PRECISION BORING MACHINE

Curt Pleger, Vienna, Austria, assignor to Ernst Krause & Co. A. G., Vienna, Austria Application October 31, 1935, Serial No. 47,699
In Germany November 5, 1934

2 Claims. (Cl. 77—4)

Precision boring machines having horizontal working spindles have been proposed in which the driving means for the spindles and the driving means of the machine are housed in a box-form bed. These machines have the drawback that the rotating parts are arranged high above the floor, so that owing to this and to the power drive considerable vibrations and shocks are set up in the box-form bed. A further drawback consists in this that there is double bearing play (in the spindles and in the slide).

In the case of horizontal precision boring machines having one or more spindles, in which the spindles are journalled in a bearing in such a manner as to be immovable in the axial direction and the work is mounted upon a displaceable slide, there is double bearing play, namely in the spindle bearings on one hand and in the slide track on the other hand, whereby the accuracy of the work suffers.

In vertical standard boring machines in which the spindle is journalled in a bearing which is displaced on a slide or in a sleeve, or in which the bearing is axially immovable and a heavy table, which can only be prevented from canting with difficulty, is raised and lowered, there is the same drawback. Moreover, in this case the accommodation conveniently of work of considerable size is prevented owing to the fact that the work has first of all to be bedded down upon a table which has been moved out laterally and has subsequently to be brought under the spindle centre. Further these machines have a limited reach between the boring spindles and the wall of the machine standard, so that work having large projections or the like cannot be operated upon at all or can only be operated upon with difficulty. If these machines are constructed with a plurality of spindles then vibrations are set up which are due mainly to the spindles not running synchronously and such vibrations can only be taken up with difficulty even by standards of considerable strength.

Some of the drawbacks of these precision boring machines are avoided in the known single spindle fine boring machines, which are constructed as a rule as pedestal machines. In the case of some of the known pedestal precision boring machines, the same bearing means serve for guiding the spindle during its rotary and feed motions so that there is only one bearing plane and the accuracy of the work is considerably increased. Freedom from vibration, however, above all in the case of multi-spindle machines, has not hitherto been attained in spite of great weight which is attended by difficulties with regard to their accommodation and in spite of a limited reach.

The present invention has for its object to provide a precision boring machine having one or more spindles which is intended more particularly for producing accurate bored holes, such as for example are required in the case of internal combustion engines or the like. Such a machine can be employed for all purposes in which precision bored holes have to be produced. The new machine has the advantage over the hitherto proposed machines that its weight for a similar power is much lower. The machine according to the invention consists in the combination of known features and is characterized substantially by this, that the boring spindles are arranged without the power driving means in a box-form bed on the upper face of which the work is held down, the spindles operating upwardly from below and the same bearing means serving for guiding the spindles during their rotary and axial feed motions. Upon the upper face of the box-shaped bed is provided a slide upon which the work is to be clamped.

The combination according to the invention has the following advantages:—all the driving parts of the machine are housed within the box-form bed in proximity to the ground, while the driving motor is arranged behind the machine so that vibrations due to the motor are completely avoided and all vibrations due to non-synchronous running of a plurality of spindles with respect to one another are eliminated.

Owing to the convenient supervision height of the machine the work to be operated on can be readily clamped down in position as desired. The work table lies entirely free so that even bulky work can be operated upon, which in the case of column precision boring machines having of course a limited reach is not possible.

Each of the boring spindles which operates upwardly from below is guided in a bearing which not only allows the spindle to rotate therein but also serves for guiding the spindle during its feed motion, the said bearing being solidly anchored in the rigid box-form body.

The construction in accordance with the invention enables a machine to be provided of light weight, which is very stable and quite free from vibration. This type of construction enables from 1 to 8 spindles to be employed without trouble, the distance apart of these spindles being capable of being readily adjusted with great accuracy.

Figure 2:
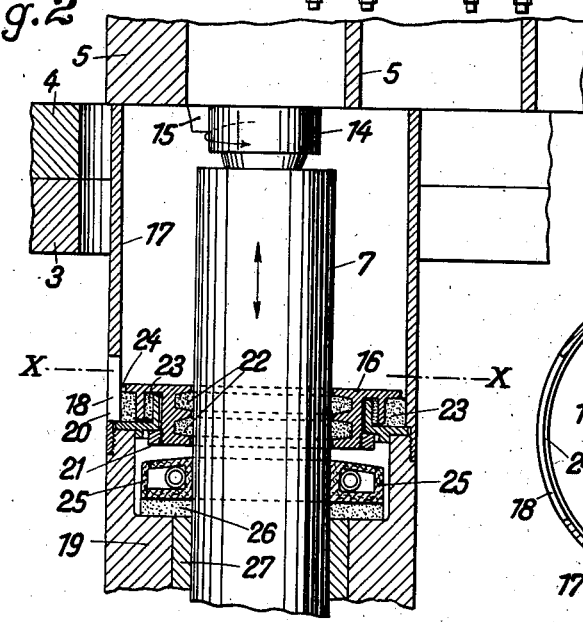
Figure 3:
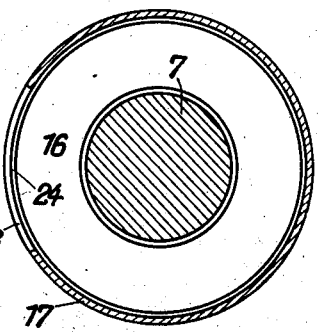
Figure 4:
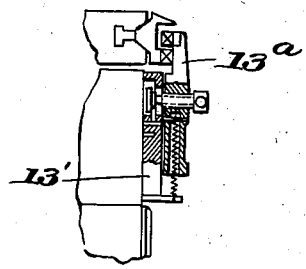
Figure 5:
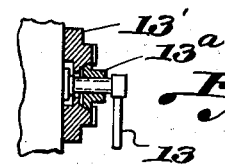
Figure 6:
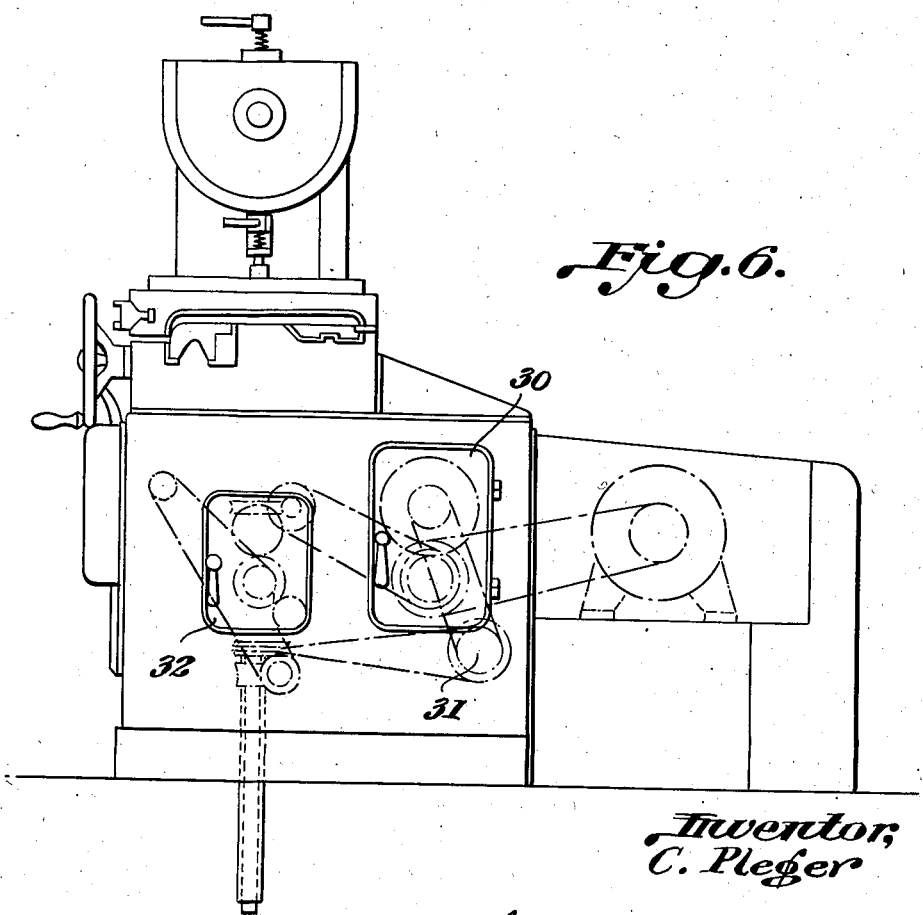

The new machine is illustrated in one constructional example in the accompanying drawings, in which Fig. 1 is an elevation of the machine.
Fig. 2 is a section through the upper part of a spindle with its bearings.
Fig. 3 a section on X—X of Fig. 2.
Fig. 4 shows the indicating device for locating the work-table in section.
Fig. 5 shows the same in horizontal section.
Fig. 6 is a side elevation of the machine with driving unit.

Referring to the drawings, 1 is the box-shaped bed or base on which is mounted the lower part 2 of the table, which is fixed to the bed, and 3 is the slide on which the plate 4 for fixing the work is rigidly mounted. On the fixing plate 4 rests the work to be operated on, for instance, two four-cylinder blocks 5 for motor car engines. The two work pieces 5 are held lightly and centered on the fixing plate 4 by means of the fixing device 6. In the bed 1, near the base of the same is disposed the drive for the spindles 7 which receive their rotary motion from belt pulleys lying in one plane. Through the control casing 8 disposed laterally on the bed the quick-motion feed and the working feed of the spindles 7 in both directions is produced. The whole machine receives its drive from a driving unit positioned behind the machine, for instance an electric motor. The motor drives a gear box 30 in which the different spindle speeds are obtained by changing toothed wheels. This box also contains the clutch and brake for starting and stopping the spindles. The gear box drives a longitudinal shaft 31 in the bed 1, which in turn drives the separate spindles.

The feed box 32 receives the quick-motion feed from the steadily running shaft of the gear box 30, and the working feed from the shaft 31. The different feed motions are obtained by inserting change wheels. The clutches for the quick-motion and working feed are actuated by a control disc in the box 8, a semi-automatic operation of the machine being obtained by means of adjustable cams. The working feed is transmitted by a noiseless chain from the feed box to an articulated shaft 33 which drives the threaded feed spindle of the separate spindle brackets by means of a worm and worm wheel. The electric motor is put into and out of operation by the pedal 9. By moving the main lever 10 to the right the spindles 7 are put in rotation and the quick-motion feed is put in operation, which brings the spindles as they rotate up to the work 5, when it is changed over to the working feed which continues until the cut is finished. At the end of the cut the working feed is shut off by the control casing 8 and, by laying over the main lever 10 to the left, the rotary motion of the spindles 7 is braked and brought to rest, whereupon the spindles return without rotating with the quick motion feed back to their initial position.

The axial displacement of the spindles 7 can also be effected by hand by means of the hand wheel 11. During this period the automatic feed is locked in the control casing 8. By means of the hand wheel 12 the slide 3 can be displaced to the left and the right. In the slide 3 and in the fixing plate 4 a longitudinal slot for the spindles 7 is provided. Fixed to the lower part 2 of the table is an indexing device for adjusting the axial distance between the bores, as required by the work 5.

The indexing device comprises a lower guiding part 13' and the axially slidable indexing member proper 13a. The guiding part 13' has straight dove-tail guides in which the indexing member 13a is slidably fitted, which is supported from below on an eccentric fixed on a spindle passing through a slot in the indexing member and provided with an actuating handle 13, the indexing member bearing against the eccentric under the action of a powerful spring tending to force the indexing member into its lowermost position. By turning the handle 13 through 180 degrees to the right from the position shown in Fig. 1, the indexing member is first of all lowered on the eccentric under the action of the spring into its lowermost position and during the further rotation of the handle the indexing member is immovably clamped to the guiding part 13', for which purpose the spindle on which the handle 13 is fixed is provided with a screw thread which engages in a threaded hole provided in the back of the guiding part 13'. When the handle 13 is turned to the left into the position shown in Fig. 1 the clamping action is first of all discontinued and the indexing member is then raised by the eccentric against the action of the spring. The indexing member 13a bears at its upper end a hardened pointed locating member which fits one or more mating locating rests, which are slidably mounted on the slide 3 and can be bolted down on to the slide at any desired distances apart from one another.

On the spindle 7 is rigidly fixed the cutter head 14 with the cutter 15. The chips produced in boring fall on the plate 16 which rotates with the spindle 7 and are thrown by centrifugal force against the wall of a tube 17 and conveyed through an opening 18 in the wall into the chip box disposed in the bed.

The tube 17 is secured on to the main spindle bearing 19 and holds a stationary sealing ring 20. By this sealing ring 20 the plate 16 with the nut 21 is secured against axial displacement. The annular channels turned in the plate 16 are filled with a sealing material 22 which carries round the plate 16 when the spindle 7 rotates and also wipes off the chips adhering to the spindle 7. Between the labyrinths of the plate 16 and the sealing ring 20 is a sealing material 23 which makes it impossible for chip particles which may penetrate through the gap 24 to enter the main bearing 19.

For preventing the penetration of even the finest dust particles which might be carried along by the spindles 7, there are provided below the plate 16 two further sealing rings 25 and 26 which take part in the rotary motion and which, lying one behind the other, prevent the penetration of even the finest chip particles into the main bearing 19 and its bush 27.

What I claim is:—

1. In a machine for finish-boring cylinder blocks, a box-like bed; a plurality of tool spindles vertically arranged and longitudinally spaced in the bed and adapted to be projected through an opening in the upper side of said bed, bearings for rotatably and axially guiding said spindles adjacent the upper surface of said bed, the upper portion of said bed being provided with horizontal guideways extending on opposite sides of said spindles longitudinally of said bed; a work table fitting said guideways for work positioning movement transversely of the spindles, provided with openings permitting projection of the spindles and adapted to hold the work in close proximity to said bearings; means for locking the table with certain cylinder block bores in axial alignment with the spindles, and means within the bed for rotating and feeding the spindles.

2. In a machine for finish-boring cylinder blocks, a box-like bed; a plurality of tool spindles vertically arranged and longitudinally spaced in the bed, and adapted to be projected through an opening in the upper side of said bed, each of said spindles having a boring tool comprising a single cutting blade, bearings for rotatably and axially guiding said spindles adjacent the upper surface of said bed, the upper portion of said bed being provided with horizontal guideways extending on opposite sides of said spindles longitudinally of said bed; a work table fitting said guideways for work positioning movement transversely of the spindles, provided with openings permitting projection of the spindles and adapted to hold the work in close proximity to said bearings; means for locking the table with certain cylinder block bores in axial alignment with the spindles, and means within the bed for rotating and feeding the spindles.

CURT PLEGER.